US012168898B2

(12) United States Patent
Hubberstey et al.

(10) Patent No.: US 12,168,898 B2
(45) Date of Patent: Dec. 17, 2024

(54) S-HOOK LATCH

(71) Applicant: Rohr, Inc., Chula Vista, CA (US)

(72) Inventors: Mark Hubberstey, Stafford (GB); Michael Somerfield, Stoke-On-Trent (GB)

(73) Assignee: ROHR, INC., Chula Vista, CA (US)

( * ) Notice: Subject to any disclaimer, the term of this patent is extended or adjusted under 35 U.S.C. 154(b) by 23 days.

(21) Appl. No.: 17/827,265

(22) Filed: May 27, 2022

(65) Prior Publication Data

US 2023/0003062 A1 Jan. 5, 2023

(30) Foreign Application Priority Data

Jul. 5, 2021 (EP) .................................. 21275093

(51) Int. Cl.
*E05C 3/00* (2006.01)
*E05C 7/00* (2006.01)
*F02K 1/76* (2006.01)

(52) U.S. Cl.
CPC ............... *E05C 3/004* (2013.01); *E05C 7/00* (2013.01); *F02K 1/766* (2013.01)

(58) Field of Classification Search
CPC . E05C 3/004; E05C 7/00; F02K 1/766; E05B 51/02; E05B 47/023
See application file for complete search history.

(56) References Cited

U.S. PATENT DOCUMENTS

| | | | | |
|---|---|---|---|---|
| 2,096,980 A | * | 10/1937 | Schjolin | E05C 3/34 292/DIG. 40 |
| 2,780,057 A | * | 2/1957 | Stavert | F02K 1/76 239/265.19 |
| 4,422,605 A | * | 12/1983 | Fage | F02K 1/60 244/113 |
| 4,424,669 A | * | 1/1984 | Fage | F02K 1/766 244/110 B |
| 4,671,460 A | * | 6/1987 | Kennedy | F02K 1/60 239/265.19 |
| 5,224,342 A | * | 7/1993 | Lair | F02K 1/766 239/265.33 |
| 5,775,639 A | * | 7/1998 | Fage | F02K 1/60 239/265.29 |
| 5,819,527 A | * | 10/1998 | Fournier | F02K 1/76 244/110 B |
| 5,953,904 A | * | 9/1999 | Mountney | F02K 1/766 239/265.29 |

(Continued)

FOREIGN PATENT DOCUMENTS

JP S4933100 3/1974
WO 2015410450 9/2015

OTHER PUBLICATIONS

EPO, Extended European Search Report dated Nov. 23, 2021 in EP Serial No. 21275093.9.

*Primary Examiner* — Christine M Mills
*Assistant Examiner* — Faria F Ahmad
(74) *Attorney, Agent, or Firm* — SNELL & WILMER L.L.P.

(57) ABSTRACT

A latching mechanism is described comprising: a latching component and a retaining component; wherein the latching component comprises means for receiving a hook in use, and a pivoting feature which is configured to allow said latching component to pivot relative to said retaining component.

14 Claims, 7 Drawing Sheets

(56) References Cited

U.S. PATENT DOCUMENTS

| | | | | |
|---|---|---|---|---|
| 6,487,845 | B1* | 12/2002 | Modglin | F02K 1/60 |
| | | | | 239/265.29 |
| 7,104,500 | B1 | 9/2006 | Smith | |
| 7,146,796 | B2* | 12/2006 | Lair | F02K 1/72 |
| | | | | 244/110 B |
| 8,628,128 | B2* | 1/2014 | Sternberger | B64C 13/00 |
| | | | | 292/302 |
| 8,764,072 | B2* | 7/2014 | Gonidec | E05B 83/16 |
| | | | | 292/207 |
| D908,477 | S | 1/2021 | Liu | |
| 11,512,511 | B2* | 11/2022 | Timms | E05C 3/34 |
| 11,746,572 | B2* | 9/2023 | Blum | E05B 83/00 |
| | | | | 292/44 |
| 2002/0145078 | A1* | 10/2002 | Rouyer | F02K 1/766 |
| | | | | 244/110 B |
| 2012/0227678 | A1 | 9/2012 | Milani | |
| 2015/0071732 | A1 | 3/2015 | Hong | |
| 2016/0053720 | A1* | 2/2016 | Kioua | F02K 1/72 |
| | | | | 415/148 |
| 2017/0022934 | A1* | 1/2017 | Caruel | F02K 1/60 |
| 2019/0210844 | A1 | 7/2019 | Redder | |
| 2020/0063474 | A1 | 2/2020 | Timms et al. | |
| 2023/0160356 | A1* | 5/2023 | Bujon | F02K 1/76 |
| | | | | 60/226.2 |

* cited by examiner

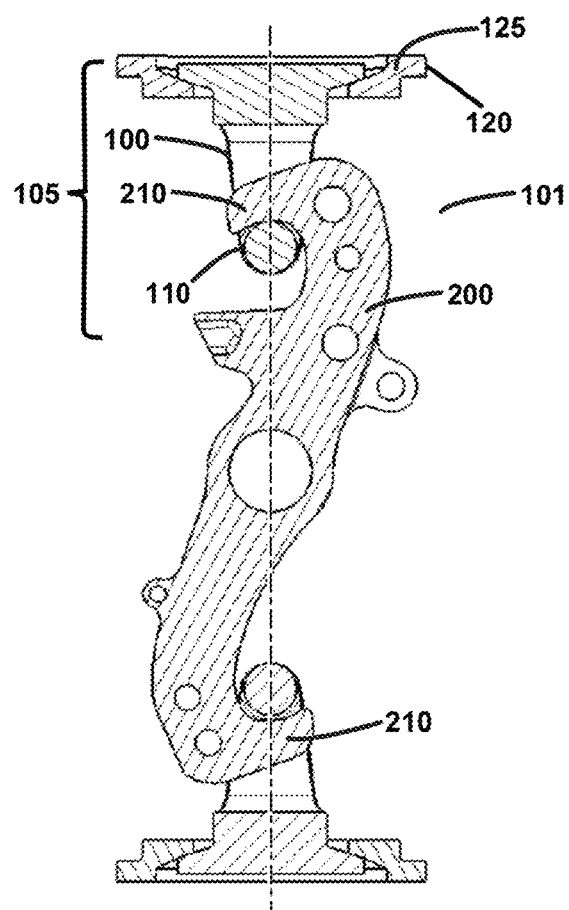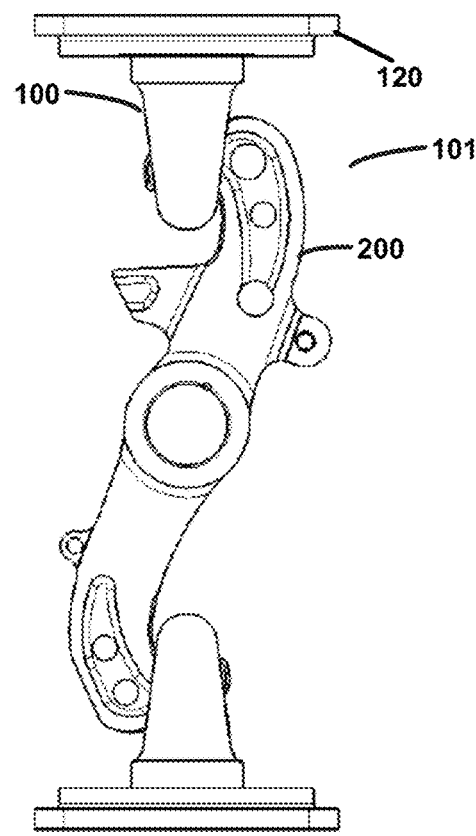
FIG 2A
FIG 2B

S-HOOK LATCH

CROSS-REFERENCE TO RELATED APPLICATIONS

This application claims priority to, and the benefit of, EP Patent Application No. 21275093.9, filed Jul. 5, 2021, and titled "S-HOOK LATCH," which is incorporated by reference herein in its entirety for all purposes.

FIELD

The examples described herein relate to locking mechanisms. In particular, the examples described herein relate to locking mechanisms which use an S-shaped locking member.

BACKGROUND

Locking mechanisms using an S-shaped locking member are used in a range of applications. For example, in the field of aircraft engines, such S-shaped locking mechanisms can be used to lock thrust reverser doors in a retracted position.

Some known locking mechanisms have a latch/S-hook interface that allows for relative movement between the latch and the S-hook, as the latch is required to move axially relative to the S-hook. This is due to the pivot door design. This relative motion, however, creates wear and damage to the S-hook. The S-hook is a safety critical component of a TRAS primary lock. The robustness of the lock, however, is compromised by this wear.

US 2020/0063474 A1 describes a locking mechanism for a thrust reverser door which uses an S-shaped locking member comprising respective locking hooks arranged at the opposed arms of the locking member. A pivot is arranged between the arms of the locking member, around whose axis the locking member rotates. A coupling is provided for coupling the locking member to an actuator for rotating the locking member around the pivot axis. The S-shaped locking member therefore pivots about a point in the middle of the S-shaped hook.

SUMMARY

A catch is described herein for use in a locking mechanism, and in particular a latch-type locking mechanism, the catch comprises a catching portion and a retaining portion. The catching portion is configured to receive and engage with a locking member in use. The retaining portion is configured, in use, to retain the catch in position relative to a first component that is to be locked. The catch comprises means configured to allow said catching portion to pivot relative to said retaining portion.

In some examples described herein, the catching portion may comprise a barrel shaped portion configured to receive and engage with said locking member in use.

In some examples described herein, the pivoting means may comprise the catching portion having a spherical section which fits into a correspondingly shaped spherical recess in the retaining portion.

In some examples described herein, the catch may further comprise a seal or seals that is or are positioned between the latching portion and the retaining portion of the catch.

In some examples described herein, the catch may further comprise a centering means that is configured to center the catching portion relative to said retaining portion prior to engagement with said locking member.

In some examples described herein, the centering means may comprise a seal that is, or seals that are, positioned between the latching portion and the retaining portion of the catch.

In some examples described herein, the pivoting means may be configured to allow motion in all axes.

In some examples, the retaining portion may be configured to be attached to said first component in use.

In other examples, the retaining portion may be configured to retain said catch in position relative to said component, due to contact between the retaining portion and the component, as well as a tensile force applied to said catch by said locking member.

A locking mechanism is also described herein, wherein the locking mechanism is a latching mechanism, comprising a first catch. The first catch may be the catch as described above. The locking mechanism may further comprise a second catch, and the locking member as described above. The locking member may comprise an S-shaped locking member having a hook at a first end configured to engage with said first catch and having a second hook at a second end configured to engage with said second catch.

In some examples, the first catch and the second catch may be identical. In other examples, the second catch may be different to the first catch.

In some examples described herein, the second catch may also comprise a catching portion and a retaining portion. The catching portion of said second catch may be configured to receive and engage with said locking member in use. The retaining portion of said second catch may be configured to be retained in position relative to a second component that is to be locked in position relative to said first component; and said second catch may comprise means configured to allow said catching portion of said second catch to pivot relative to said retaining portion of said second catch in use.

In some examples described herein, the locking member may be configured to rotate about its own axis and enable fore/aft motion.

In some examples, the component to be locked may be a thrust reverser door.

The retaining portion of the first catch may be attached to a first component of the thrust reverser door system and the retaining portion of the second catch may be attached to a second component of the thrust reverser door system. In this way, when the hooks of the S-shaped locking member are engaged with the catching portion of the first catch as well as the catching portion of the second catch, the thrust reverser door may be locked in position.

BRIEF DESCRIPTION OF THE DRAWINGS

FIG. 2A depicts a cross-sectional view of a new type of locking mechanism as described herein;

FIG. 2B depicts a side view of the new type of locking mechanism as shown in FIG. 2A;

DETAILED DESCRIPTION

Latching mechanisms comprise a latch and at least one corresponding catch. In use, the catch receives the latch to lock the mechanism and releases the latch to unlock the mechanism. Latching mechanisms which use an S-shaped locking member as the latch have a hook at either end of the S-shaped locking member and so use two catches, each of which receives one of the hooks that is provided at either end of the S-shaped locking member.

Figure 1:
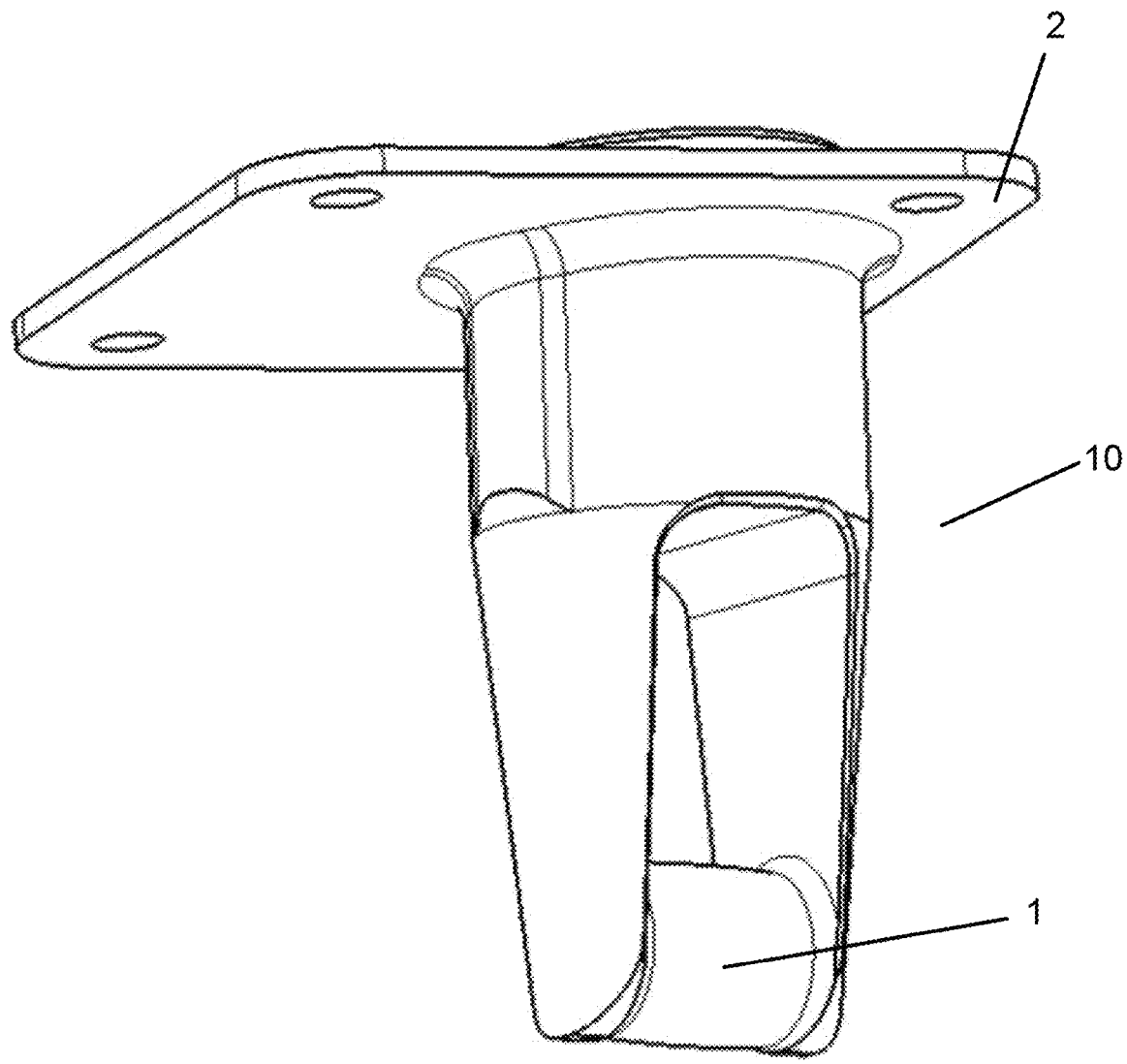
FIG. 1 shows a perspective view of a known catch for use in a latching locking mechanism.

A known catch 10 for use in a latching locking mechanism is shown in FIG. 1. The catch 10 comprises two portions—a catching portion 1 and a retaining portion 2. The retaining portion 2 is configured to retain the catch in position relative to the component that it is locking. In the example of FIG. 1, the retaining portion is configured to be attached, or connected, in use, to whichever component is to be locked by the locking mechanism.

The catch 10 comprises, at the end that is furthest from the retaining portion 2, the catching portion 1, which in this example comprise a first barrel-shaped portion 1, onto/around which the hook of an S-shaped locking member can latch or be released from. In use, a second catch 10 would be provided on a second component that is being locked together with a first component and the hooks of the S-shaped locking member would latch onto and engage with the catching portions 1 of each of the catches 10 and lock the two components together.

As can be seen in FIG. 1, the retaining portion 2 of the known catch 10 is generally flat or at least shaped so as to match the surface of the section of the component to which the catch 10 is being retained/attached. These portions 1, 2 of the catch are formed as one piece, that is, the retaining portion 2 of the catch cannot move relative to the catching portion 1. Such known designs for locks are therefore rigid and do not allow any pivoting or reduction in relative motion with an S-hook when an s-hook is connected to the catching portion 1. This is because the retaining portion 2 is not movable relative to the catching portion 10.

The new types of latching locking mechanisms described herein and with reference to FIGS. 2 to 5 differ to this in the respect that they allow the catching portion of the catch itself to pivot relative to the retaining portion and therefore eliminate relative movement and resultant wear.

Figure 2:
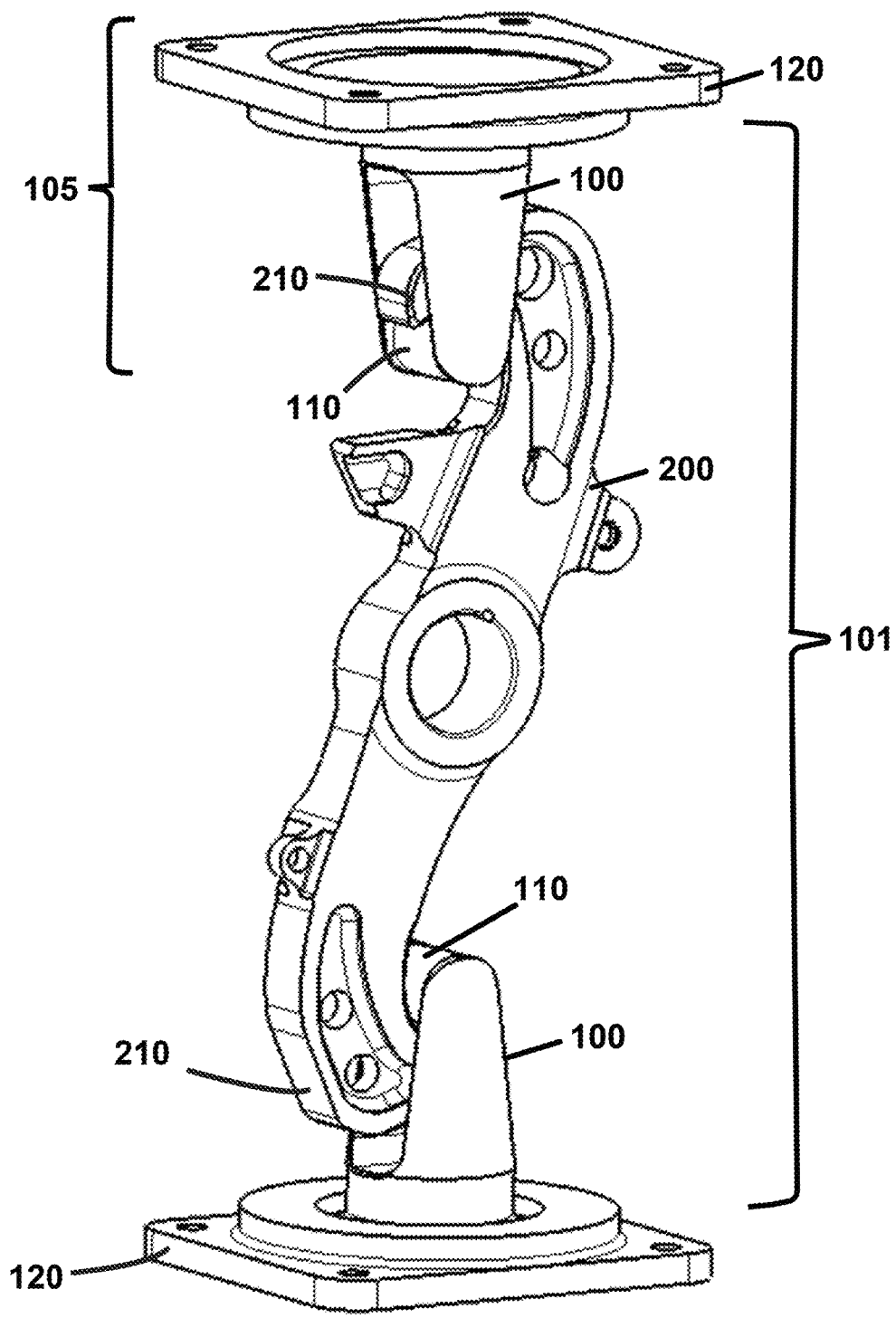
FIG. 2 depicts a latch locking mechanism comprising an S-shaped locking member and two catches, each of which would be attached to a different section of a component that is being locked together.

An example of a new type of latching locking mechanism 101 is shown in FIG. 2. The locking mechanism 101 comprises first and second catches 105 in combination with an S-shaped locking member 200 which functions as a latch in use, the hooks at either end of the S-shaped locking member 200 being received or released by each of the catches 105. The S-shaped locking member 200 comprises respective first and second hooks 210 provided at the respective ends of opposed arms of the locking member 200. The hooks 210 of the S-shaped locking member 200 engage with the first and second catches 105, which are attached to and provided on the each of the components that are being locked together when the locking member 200 is in the locked position, as shown in FIG. 2. For example, in a thrust reverser door system for an aircraft, bucket doors are installed after the nozzle of a jet engine and opened and closed like a clam shell. The upper and lower doors have catches on each corner and the locking member 200 engages with the catch on the corner of both the upper door and the lower door to lock them in position relative to each other.

These new catches 105 prevent wear on the locking mechanism by allowing the catching portion 100 of the catch 105 to pivot relative to the retaining portion 120 using a pivoting means. Since the retaining portion holds the catch 105 in position relative to the component being locked (either by being attached to the component itself, or held in place due to tensile force in use), the catch allows the catching portion 100 to pivot relative to the component 5 to which the catch 100 is attached. In the examples shown in FIGS. 2A and 2B the pivoting means comprises a spherical device. This eliminates relative motion at the catch/S-hook interface.

An example of a new type of locking mechanism with such a pivoting means incorporated therein is shown in FIGS. 2A to 4C and will now be described in detail.

Although in the examples described herein an S-shaped locking member 200 is used, the new catches 105 described herein are not limited to this and may be used with other latching members.

In some examples, the retaining portion 120 of the new type of catch 105 may be retained in position relative to the component that is being locked, by being attached to the component 5, such as a component of the thrust reverser doors of an aircraft as mentioned above.

Figure 4A:
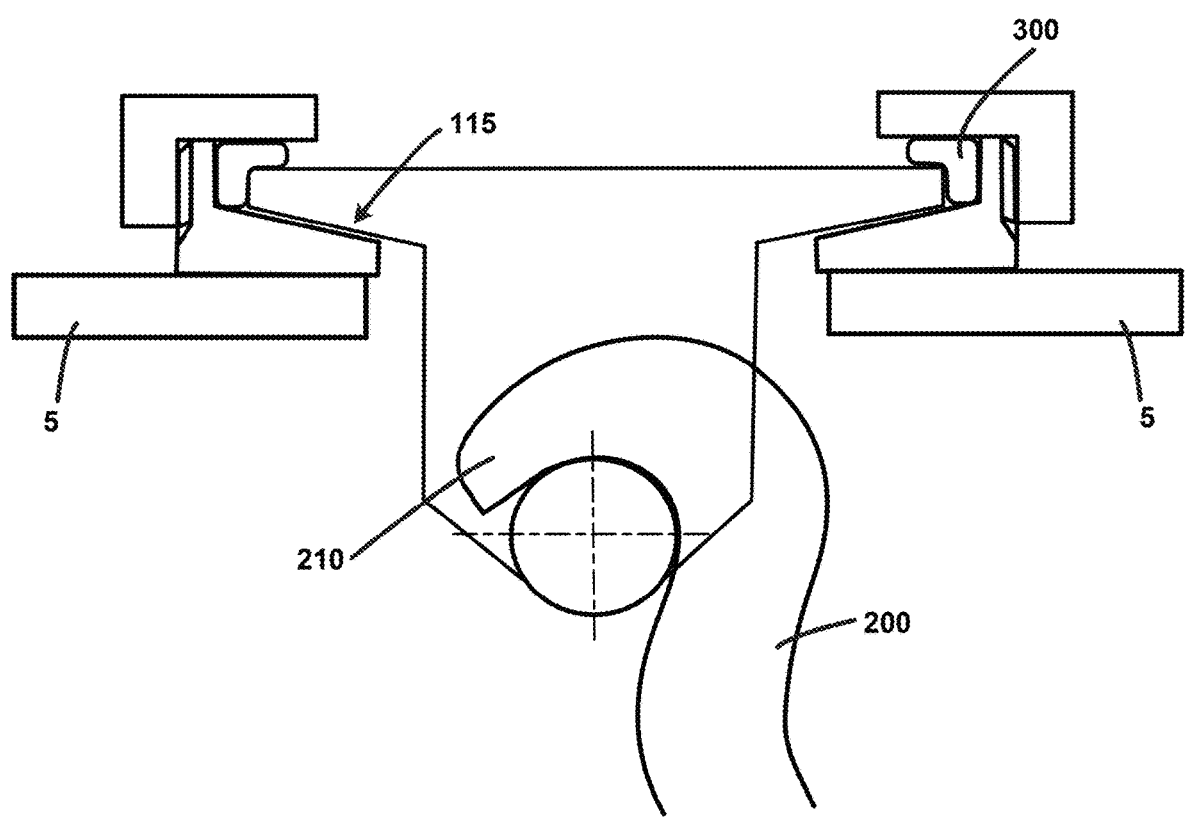
FIG. 4A shows a cross-section of a new locking mechanism as described herein, further depicting a centering feature of the catch when the hook of the S-shaped locking member is attached to the catch.
Figure 4B:
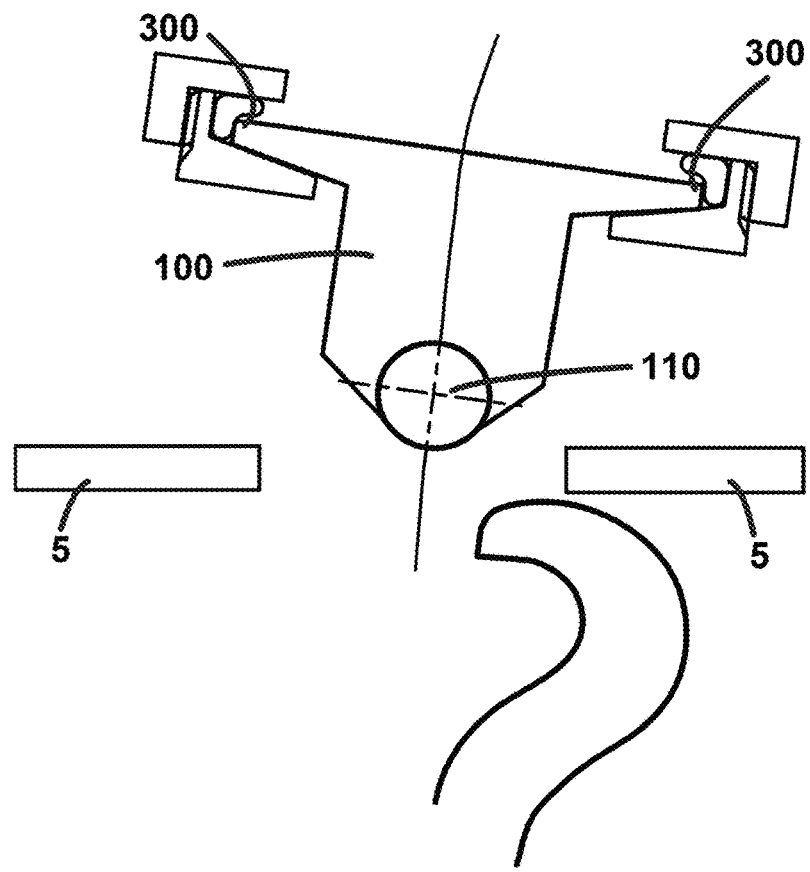
FIG. 4B shows the locking mechanism of FIG. 4A before the hook of the locking member is connected to the catching portion of the catch.
Figure 4C:
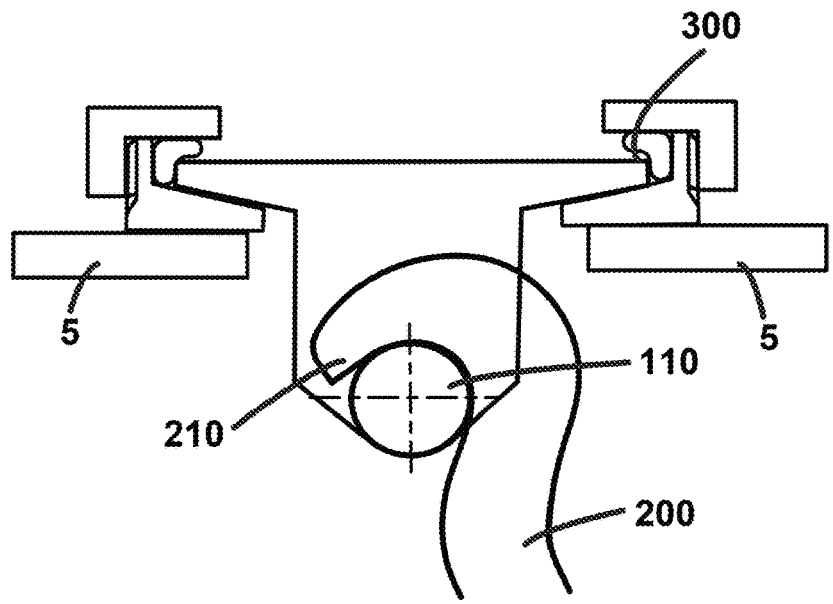
FIG. 4C shows the locking mechanism of FIG. 4A after the hook of the locking member is connected to the catching portion of the catch.

In other examples, such as that shown in FIGS. 4B and 4C, the retaining member 120 holds the catch in position relative to the component, due to its contact with the surface of the component and the tensile force that is exerted on the catch 105 when the locking member 200 is hooked onto the catching portion 105.

The catch 105 comprises a catching portion 100 and a retaining portion 120. In the same way as in the known mechanisms, at a first end, which, in use, is furthest away from the component 5 being locked, the catch 105 has a first, barrel shaped catching portion 110 for receiving and engaging with the hook 200 of the S-shaped locking member 200 in use. At its second end, which is closest to the component 5 being locked, the catching portion 100 is positioned and configured so as to be held within, and extend away from, a recess 125 of the retaining portion 120.

As mentioned briefly above, in contrast to the known latching mechanism as shown in FIG. 1, the new catch 105 shown in FIGS. 2A to 4C further comprises a pivoting means 115, 125 which allows the catching portion 100 of the catch 105 to pivot relative to the retaining portion 120 of the catch 105 in use. In the example shown in FIGS. 2A and 2B, the pivoting means comprises the catching portion 100 having a spherical upper end 115 which fits into a correspondingly shaped spherical recess 125 in the retaining portion 120. That is, the retaining portion 120 is not rigidly connected to the catching portion 100 of the catch 105, and instead, the upper end 115 of the catching portion 100 (i.e., that furthest away from the latching portion 110) is spherical and sits in a correspondingly spherically shaped recess 125 in the retaining portion 102. The catching portion 100 extends through a cavity 126 in the recess 125 and away from the retaining portion 120 as shown in FIGS. 2A and 2B.

Although the examples described herein have a pivoting means 115, 125 that comprises a spherical portion and a correspondingly shaped recess, other pivoting means may be provided.

In summary, the end 115 of the latching portion 100 that is furthest away from the catching (i.e., barrel-shaped) portion 110 has a spherical head and the spherical head is shaped and sized so as to sit in a correspondingly shaped recess 125 in the retaining portion 120. Due to the fact that these two portions 100, 120 of the catch are not fixedly attached to each other, the latching portion 100 can pivot and move relative to the retaining portion 120 in use.

Figure 3A:
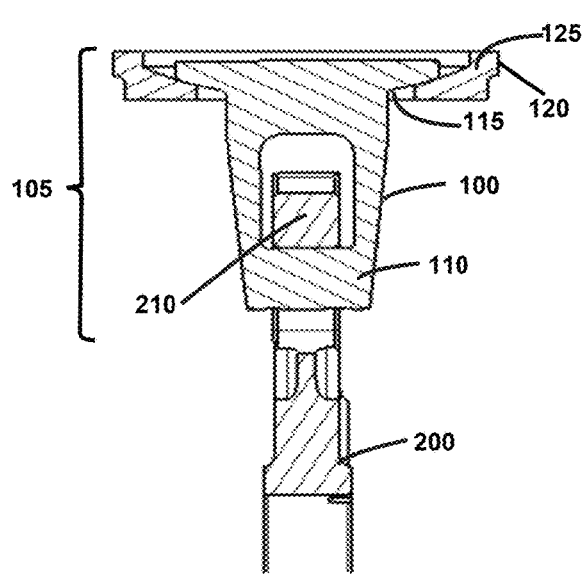
FIG. 3A depicts the locking mechanism of FIGS. 2A and 2B when the catching portion of the catch is not being moved relative to the retaining portion of the catch.
Figure 3B:
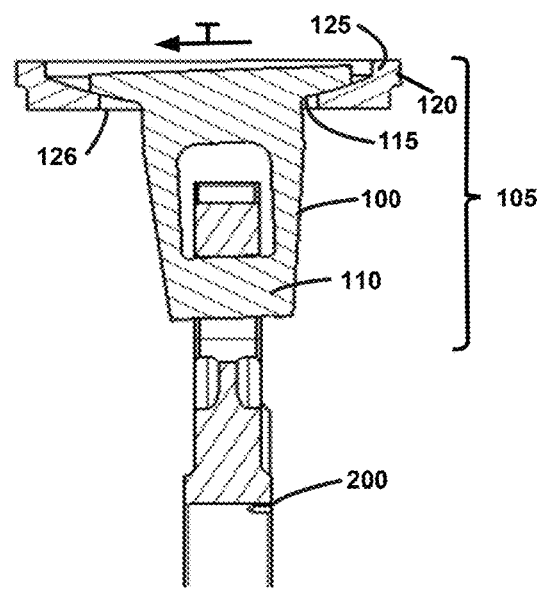
FIG. 3B depicts the locking mechanism of FIG. 3A when the catching portion of the catch is being moved relative to the retaining portion of the catch.

This relative movement can be seen in FIGS. 3A and 3B. In this example, the hook 210 of the locking member 200 may be shaped and sized so as to be configured to hook onto the first, barrel-shaped portion 110 of the catch 105 in use. The retaining portion 120 is attached to a component 5 of the aircraft such as a section of a reverse thrust door, for example. The latching mechanisms could also be used to lock other components, however, and are not necessarily limited to use in a thrust reverser door system.

In FIG. 3A the hook 210 of the S-shaped locking member 200 is latched onto the barrel-shaped portion 110 of the catching portion 100 of the catch 105 in use. The locking member 200 in this position remains stationary. In the example shown in FIG. 3B, however, the head 115 of the catching portion 100 undergoes translation T and the upper, spherical part 115 of the catching portion 100 translates axially within the spherical recess 125 of the retaining portion 120 of the catch 105. As can be seen in this figure, although the upper, spherical, part 115 of the catching portion 100 (which is provided in the recess 125 of the retaining portion 120) is now able to move axially, the lower part of the latch (i.e. the portion including the barrel-shaped catching portion 110) is able to remain in the same position and rotate around the barrel profile of the barrel-shaped portion 110 of the latching portion 100. In both FIGS. 3A and 3B the locking member 200 remains stationary.

Due to the unique structure of this latching mechanism, the S-shaped locking member 200 is configured to rotate about its own axis and enable fore/aft motion and due to the pivoting means 115, 125, the device is configured to allow motion in all axes.

In some examples, this latch concept may also include a centering means 300 which ensures that the catching portion 100 of the catch 105 re-centres each time before engagement with the S-shaped locking member 200. The centering means 300 is configured to center the latching portion 100 of the catch 105 prior to engagement with the hook 210 of the S-shaped locking member 200. This is shown in FIG. 4A. The centering device 300 may comprise a seal or seals that is/are positioned between the spherical head 115 of the latching portion 100 and the recess 125 of the retaining portion 120. Although in this example, the seals also center the catching portion 100 relative to the retaining portion 120 of the catch, a separate centering means could be provided, in addition to, or in replacement of the seals 300.

Fore/aft motion can continue to be accommodated by rotation of the S-shaped locking member 200 around its own axis although the spherical device 115, 125 will allow motion in all axes.

FIGS. 4B and 4C depict the latching mechanism when the hook is disconnected and connected, respectively.

Figure 5:
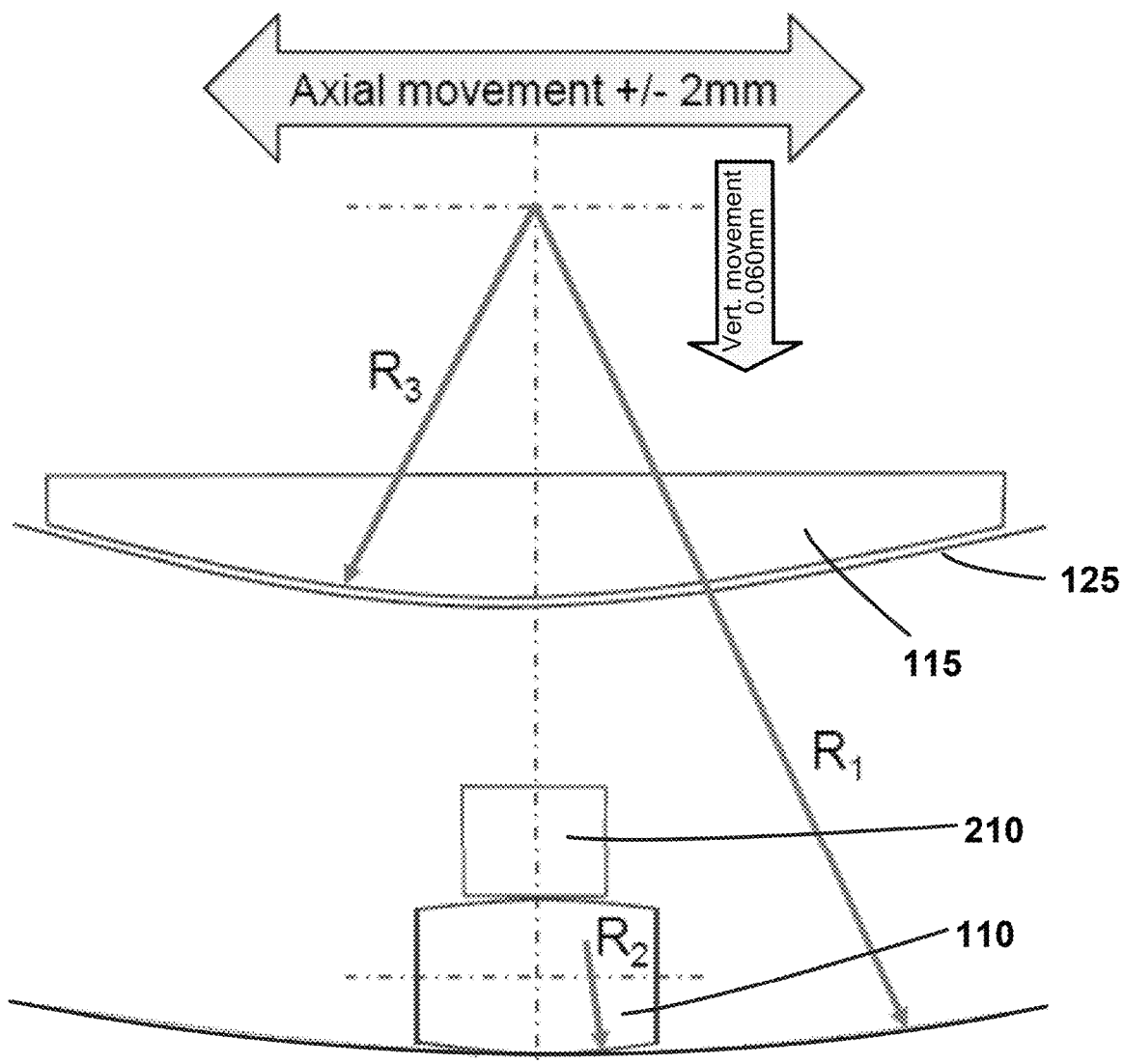
FIG. 5 depicts the relative movement of the portions of the catch of FIG. 2.

FIG. 5 depicts the movement of the catching portion 100 of the catch 105 and the S-shaped locking member 200. As can be seen in this figure, to allow the catching, or barrelled portion 110 of the catch 105 to roll along the flat profile of the hook 210 of the locking member 200, the catching portion 100 of the catch 105 is required to pivot around its own centerline and also move vertically. The vertical movement can be accommodated by the main door seal. Under normal operation the door is able to overstow, and therefore the catching portion 100 of the catch 105 can move vertically by around 6 to 7 mm. For a catch 105 of height 70 mm (R1) an axial movement of 2 mm requires the catching portion 100 to move 0.060 mm in a vertical direction. The barrelled latch enables rotation of the catching portion 100 against the hook 210 of the S-shaped locking member 200.

What is claimed is:

1. A locking mechanism, comprising:
    a first catch comprising a first catching portion and a first retaining portion,
        wherein the first catching portion is configured to receive and engage with a locking member in use;
        wherein the first retaining portion is configured to, in use, retain the first catching portion in position relative to a first component that is to be locked; and
        wherein the first catch comprises pivoting means configured to allow the first catching portion to pivot relative to the first retaining portion;
        wherein the pivoting means comprises the first catching portion having a spherical section which fits into a correspondingly shaped spherical recess in the first retaining portion; and
    a second catch, wherein the locking member comprises an S-shaped locking member having a first hook at a first end configured to engage with the first catching portion of the first catch and having a second end configured to engage with a second catching portion of the second catch.

2. The locking mechanism of claim 1, wherein the first catching portion comprises a barrel shaped portion configured to receive and engage with the locking member in use.

3. The locking mechanism of claim 1, further comprising a seal or seals positioned between a latching the first catching portion and the first retaining portion of the catch.

4. The locking mechanism of claim 1, further comprising:
    a centering means that is configured to center the catching portion relative to the first retaining portion prior to engagement with the locking member.

5. The locking mechanism of claim 4, wherein the centering means comprises a seal that is, or seals that are, positioned between the first catching portion and the first retaining portion of the first catch.

6. The locking mechanism of claim 1, wherein the pivoting means is configured to allow motion in all axes.

7. The locking mechanism of claim 1, wherein the first retaining portion is configured to be attached to the first component in use.

8. The locking mechanism of claim 1, wherein the first retaining portion is configured to retain the first catching portion in position relative to the first component, due to contact between the first retaining portion and the first component, as well as a tensile force applied to the first catching portion by the locking member.

9. The locking mechanism claim 1,
    wherein the second end of the S-shaped locking member comprises a second hook configured to engage with the second catching portion of the second catch.

10. The locking mechanism of claim 9,
    wherein the second catch comprises the second catching portion and a second retaining portion, wherein the second catching portion of the second catch is configured to receive and engage with the locking member in use;

wherein the second retaining portion of the second catch is configured to retain the second catch in position relative to a second component; and wherein the second catch comprises means configured to allow the second catching portion of the second catch to pivot relative to the second retaining portion of the second catch in use.

11. The latching mechanism of claim 9, wherein the locking member is configured to rotate about its own access axis and enable fore/aft motion.

12. The latching mechanism of claim 9, wherein the first and second components comprise components of a thrust reverser door system of an aircraft.

13. The latching mechanism of claim 12, wherein the first retaining portion of the first catch is attached to the first component of the thrust reverser door and the second retaining portion of the second catch is attached to the second component of the thrust reverser door.

14. The latching mechanism of claim 9, wherein, responsive to the first hook of the locking member being engaged with the first catching portion of the first catch and the second hook of the locking member being engaged with the second catching portion of the second catch, the thrust reverser door is locked in position.

* * * * *